United States Patent
Ferrara et al.

(10) Patent No.: US 11,658,528 B2
(45) Date of Patent: May 23, 2023

(54) ROTARY ELECTRIC MACHINE WITH LIGHTENED ROTOR

(71) Applicant: FERRARI S.p.A., Modena (IT)

(72) Inventors: Davide Ferrara, Modena (IT); Luca Poggio, Modena (IT); Paolo Faverzani, Modena (IT)

(73) Assignee: FERRARI S.P.A., Modena (IT)

(*) Notice: Subject to any disclaimer, the term of this patent is extended or adjusted under 35 U.S.C. 154(b) by 94 days.

(21) Appl. No.: 17/167,781

(22) Filed: Feb. 4, 2021

(65) Prior Publication Data

US 2021/0242735 A1    Aug. 5, 2021

(30) Foreign Application Priority Data

Feb. 5, 2020 (IT) .................. 102020000002266

(51) Int. Cl.
| | |
|---|---|
| *H02K 1/27* | (2022.01) |
| *H02K 1/2753* | (2022.01) |
| *H02K 5/20* | (2006.01) |
| *H02K 1/28* | (2006.01) |
| *H02K 3/12* | (2006.01) |

(52) U.S. Cl.
CPC ............ *H02K 1/2753* (2013.01); *H02K 1/28* (2013.01); *H02K 3/12* (2013.01); *H02K 5/207* (2021.01)

(58) Field of Classification Search
CPC .. H02K 5/20; H02K 5/207; H02K 9/02; H02K 9/04; H02K 9/06; H02K 1/2753; H02K 1/2783; H02K 1/28
See application file for complete search history.

(56) References Cited

U.S. PATENT DOCUMENTS

| | | | |
|---|---|---|---|
| 4,930,201 A | 6/1990 | Brown | |
| 10,581,288 B2* | 3/2020 | Takano | ................. H02K 1/278 |
| 11,368,073 B2* | 6/2022 | Takahashi | ............. H02K 11/33 |
| 11,539,251 B2* | 12/2022 | Wang | .................. H02K 21/227 |
| 2005/0040721 A1 | 2/2005 | Kusase et al. | |

(Continued)

FOREIGN PATENT DOCUMENTS

| | | |
|---|---|---|
| CN | 107681832 A | 2/2018 |
| CN | 110460198 A * | 11/2019 |

(Continued)

OTHER PUBLICATIONS

Machine Translation of CN 110460198 A (Year: 2019).*

(Continued)

*Primary Examiner* — Rashad H Johnson
(74) *Attorney, Agent, or Firm* — Cantor Colburn LLP

(57) ABSTRACT

Electric machine having: a shaft; a rotor with permanent magnets that is fitted to the shaft; a stator having a magnetic core which consists of a series of laminations made of ferromagnetic material and longitudinally crossed by a plurality of stator slots; and a stator winding having a plurality of rigid bars that are inserted in corresponding stator slots and that are covered, on the outside, with an insulating coating. The rotor has a plurality of magnetic elements, which are arranged beside one another around the rotation axis so as to form a closed ring. Each magnetic element is formed by a plurality of permanent magnets which are axially arranged one after the other according to a Halbach array.

19 Claims, 10 Drawing Sheets

(56) References Cited

U.S. PATENT DOCUMENTS

| | | | |
|---|---|---|---|
| 2009/0142203 A1* | 6/2009 | De Filippis | F04D 25/0606 |
| | | | 417/353 |
| 2014/0111052 A1 | 4/2014 | Wu et al. | |
| 2017/0222494 A1* | 8/2017 | Hunstable | H02K 21/24 |
| 2018/0198332 A1* | 7/2018 | Ueda | H02K 16/00 |
| 2018/0212486 A1* | 7/2018 | Hunstable | H02K 21/14 |
| 2019/0199185 A1* | 6/2019 | Hunstable | H02K 21/16 |
| 2019/0109502 A1 | 9/2019 | Kawanami et al. | |
| 2019/0305619 A1* | 10/2019 | Takaki | H02K 1/274 |
| 2019/0386538 A1* | 12/2019 | Koerner | B61C 9/38 |
| 2020/0007007 A1* | 1/2020 | Haran | H02K 1/16 |
| 2020/0161939 A1* | 5/2020 | Takahashi | H02K 3/12 |
| 2020/0185997 A1* | 6/2020 | Hirasawa | H02K 7/14 |
| 2020/0313481 A1* | 10/2020 | Patel | H02K 17/02 |
| 2020/0328639 A1* | 10/2020 | Takahashi | H02K 1/2786 |
| 2020/0328640 A1* | 10/2020 | Takahashi | H02K 1/2786 |
| 2020/0336033 A1* | 10/2020 | Takahashi | H02K 3/00 |
| 2020/0403467 A1* | 12/2020 | Takahashi | H02K 11/33 |
| 2020/0403468 A1* | 12/2020 | Takahashi | H02K 1/2766 |
| 2021/0021182 A1* | 1/2021 | Tremelling | H02K 1/187 |
| 2021/0265885 A1* | 8/2021 | Takahashi | H02K 1/2786 |
| 2021/0273511 A1* | 9/2021 | Takahashi | H02K 1/2786 |
| 2021/0288531 A1* | 9/2021 | Takahashi | H02K 3/28 |
| 2021/0328488 A1* | 10/2021 | Takahashi | H02K 3/47 |
| 2021/0384784 A1* | 12/2021 | Takahashi | H02K 21/22 |
| 2022/0166290 A1* | 5/2022 | Takahashi | H02K 11/33 |
| 2022/0200408 A1* | 6/2022 | Takahashi | H02K 11/0141 |
| 2022/0200421 A1* | 6/2022 | Takahashi | H02K 1/27915 |
| 2022/0209633 A1* | 6/2022 | Takahashi | H02K 1/2766 |
| 2022/0416601 A1* | 12/2022 | Bowman | H02K 1/30 |

FOREIGN PATENT DOCUMENTS

| | | |
|---|---|---|
| DE | 10122425 A1 | 11/2002 |
| EP | 3032703 A2 | 6/2016 |
| EP | 3208913 A1 | 8/2017 |
| JP | 2016178816 A | 10/2016 |

OTHER PUBLICATIONS

Partial European Search Report for Application No. EP21155374 dated Jul. 19, 2021, 16 pages.

Search Report issued in Italian Patent Application No. 202000002266 completed Oct. 19, 2020; 10 pages.

* cited by examiner

ROTARY ELECTRIC MACHINE WITH LIGHTENED ROTOR

CROSS-REFERENCE TO RELATED APPLICATIONS

This patent application claims priority from Italian patent application no. 102020000002266 filed on Feb. 5, 2020, the entire disclosure of which is incorporated herein by reference.

SECTOR OF THE ART

The present invention relates to a rotary electric machine.

The present invention is advantageously applied to an automotive rotary electric machine that is installed on-board a vehicle and that can be used as a motor (absorbing electric power and generating a mechanical torque) or as a generator (converting mechanical power into electric power).

PRIOR ART

An automotive rotary electric machine comprises a shaft, which is mounted so as to rotate around a central rotation axis, a rotor generally with permanent magnets that is fitted to the shaft to rotate together with the shaft, and a stator with a tubular, cylindrical shape arranged around the rotor to enclose the rotor therein.

It has long been proposed to carry out the stator winding by means of rigid bars: rigid bars are firstly shaped as a "U" and are thus axially inserted into the stator slots forming an inlet side, wherein the cusps of the "U"-shaped bars are arranged, and an outlet side, wherein the legs (i.e. the straight portions) of the "U"-shaped bars are arranged; once inserted the bars into the stator slots the legs in the outlet side are bent and the free ends of the legs are connected between them by means of welding to form the electrical paths of the stator winding.

Patent Applications US2014111052A1, EP3208913A1 and US2005040721A1 disclose a rotary electric machine provided with a rotor with permanent magnets, wherein the permanent magnets are arranged according to a circumferentially-oriented Halbach array; i.e. the rotor comprises a series of permanent magnets that are oriented axially (i.e. they have along their axial extension a same polarization), are arranged beside one another so as to form a closed ring, and have different polarizations (alternatively oriented radially and circumferentially) according to a circumferentially-oriented Halbach array.

DESCRIPTION OF THE INVENTION

The object of the present invention is to provide a rotary electric machine having a greater power efficiency and a greater specific performance (power and/or torque).

According to the present invention a rotary electric machine is provided, according to what claimed in the enclosed claims.

The claims describe preferred embodiments of the present invention forming an integral part of the present disclosure.

BRIEF DESCRIPTION OF THE DRAWINGS

The present invention will now be described with reference to the attached drawings, which illustrate a non-limiting embodiment thereof.

PREFERRED EMBODIMENTS OF THE INVENTION

Figure 1:
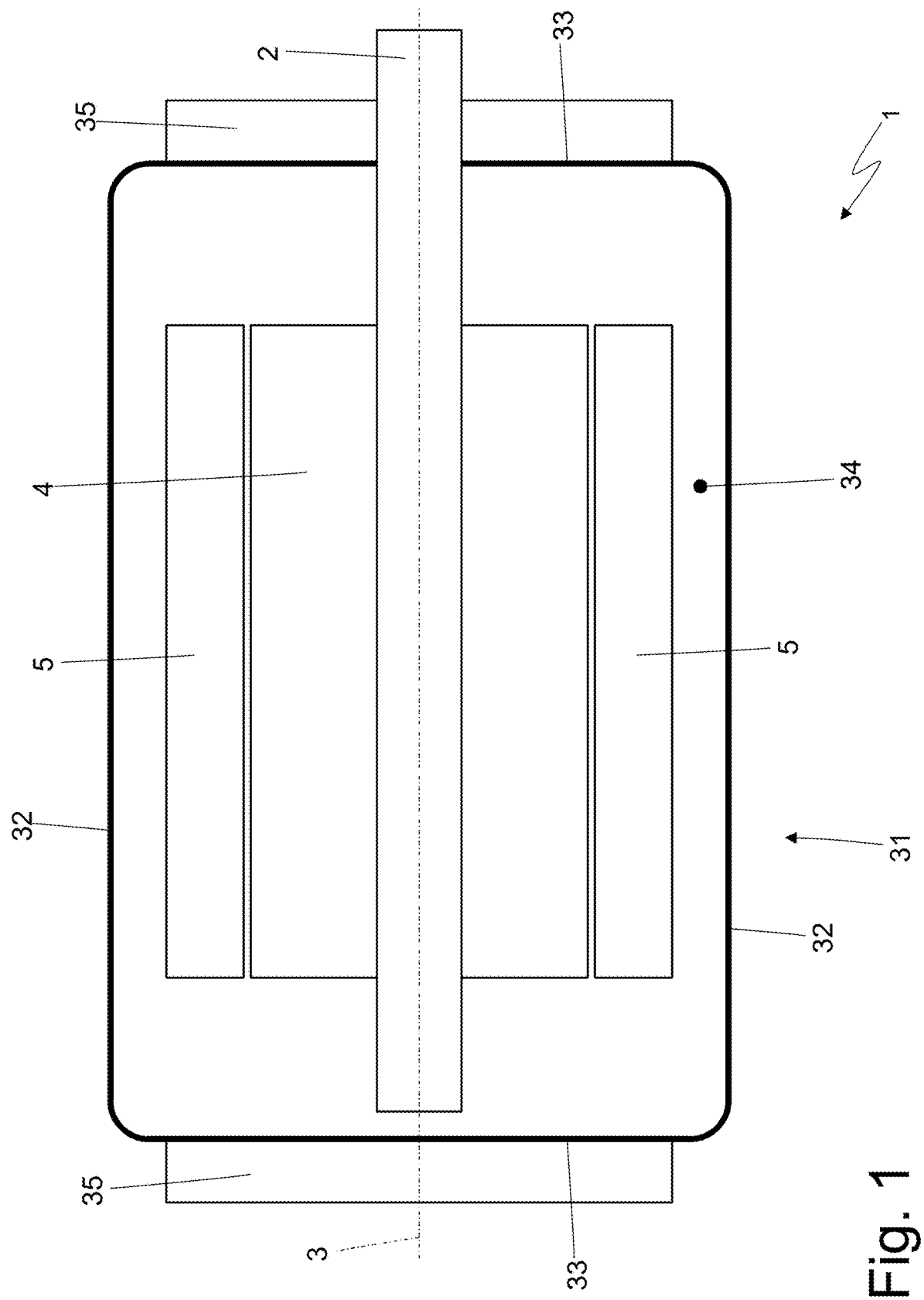
FIG. 1 is a schematic and longitudinal section view of a rotary electric machine made according to the present invention.

In FIG. 1, an automotive synchronous electric machine of the reversible type (i.e. which can operate both as an electric motor absorbing electric power and generating a drive torque, and as an electric generator absorbing mechanical power and generating electric power) is overall indicated by 1.

The electric machine 1 comprises a shaft 2, which is mounted so as to rotate around a central rotation axis 3, a rotor 4 with permanent magnets that is fitted to the shaft to rotate with the shaft 2, and a stator 5 with a cylindrical tubular shape arranged around the rotor 4 so as to enclose the rotor 4 therein.

Between the rotor 4 and the stator 5 an air gap with an annular shape and having a small thickness (normally that required to allow rotating the rotor 4 inside the stator 5 in full safety) is defined.

Figure 2:
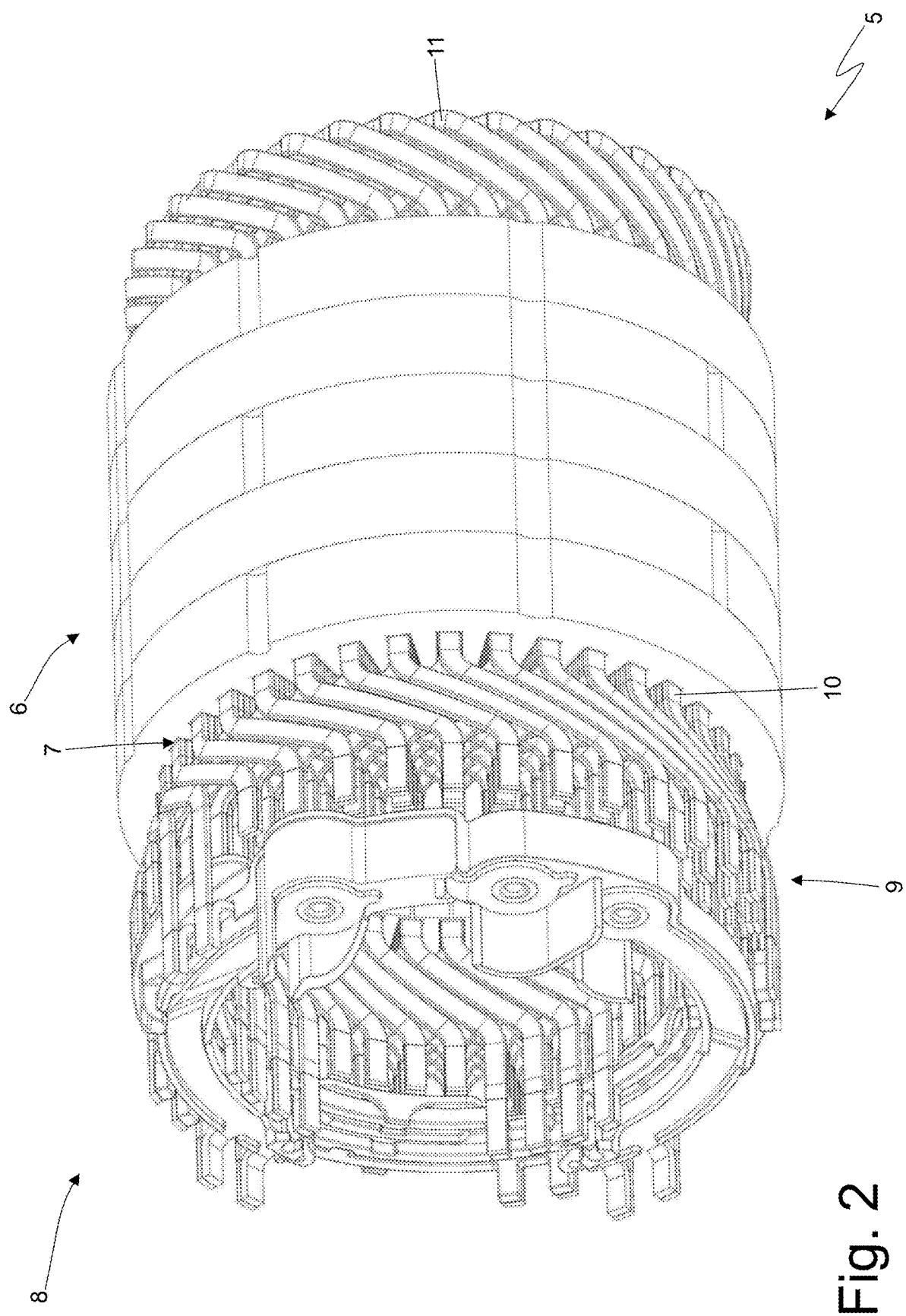
FIG. 2 is a perspective view of a stator of the rotary electric machine of FIG. 1.
Figure 3:
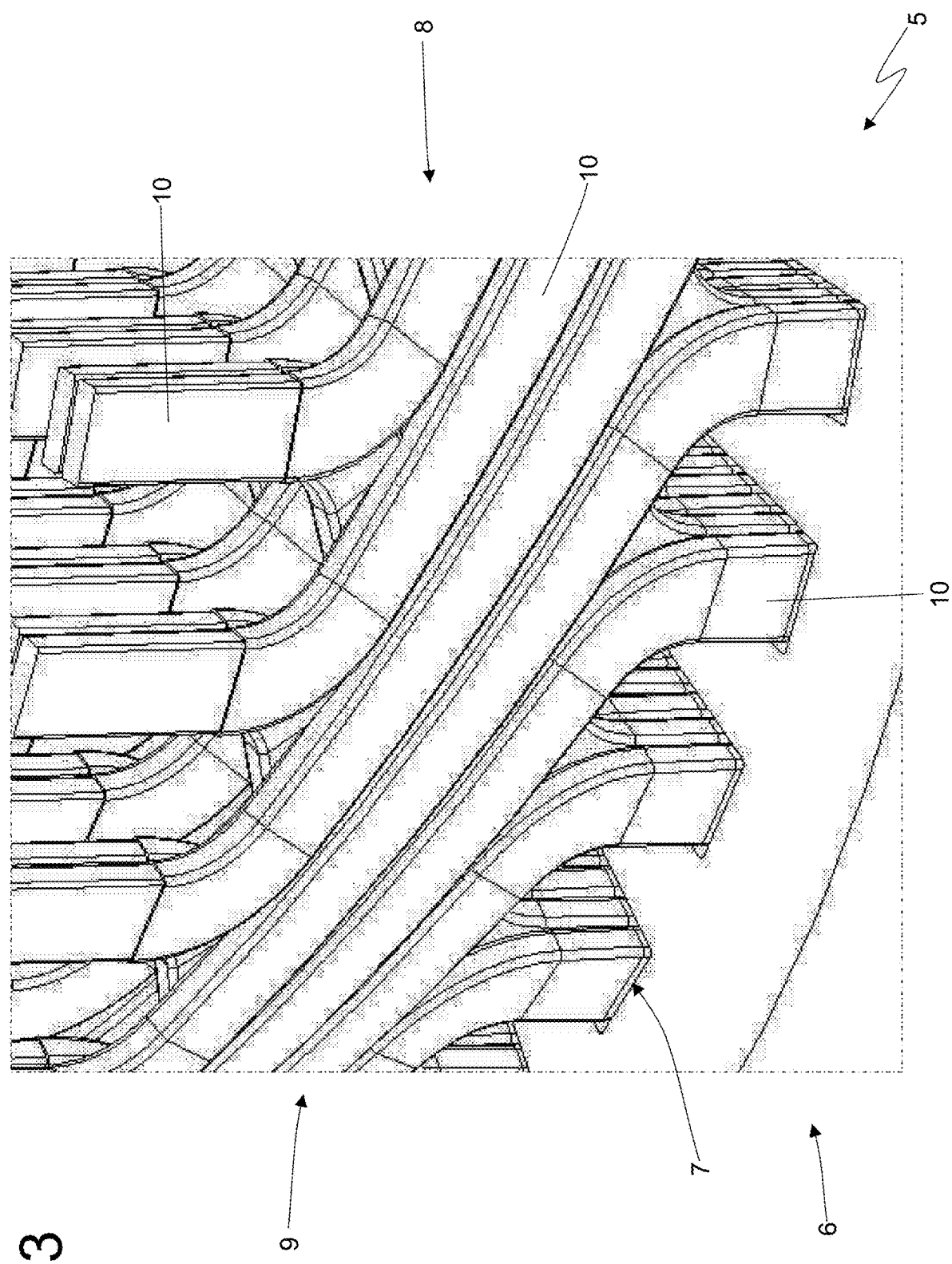
FIG. 3 is an enlarged scale view of a detail of FIG. 2.

According to what shown in FIGS. 2 and 3, the stator 5 comprises a magnetic core 6 made up of a series of laminations (made of ferromagnetic material) tightly packed (i.e. packed between each other) and has a centrally holed tubular shape; the magnetic core 6 is longitudinally (axially) crossed by a plurality of stator slots 7 which are evenly distributed along the inner side of the magnetic core 6 and which house a three-phase stator winding 8.

The three-phase stator winding 8 comprises a series of "U"-shaped copper rigid bars 9, each of which comprises two legs 10 connected between each other by a cusp 11; the two legs 10 of a same bar 9 constitute two corresponding conductors of the stator winding 8. The "U"-shaped bars 9 are inserted into the stator slots 7 defining an inlet side, wherein the cusps 11 of the "U"-shaped bars 9 are arranged, and an outlet side, wherein the legs 10 of the "U"-shaped bars 9 are arranged. In particular and according to what better shown in FIG. 4, in each stator slot 7 eight legs 10 are arranged (i.e. eight conductors of the stator winding 8) belonging to eight corresponding "U"-shaped rigid bars 9. According to what shown in FIG. 2, the ends of the legs 10 of the "U"-shaped bars 9 are bent and hence electrically connected (welded) between each other to form the electrical paths of the stator winding 8. As a result, if we consider one single stator slot 7, each bar 9 has a straight central portion being inserted into the corresponding stator slot 7 and two end portions that are bent relative to the central portion.

Figure 5:
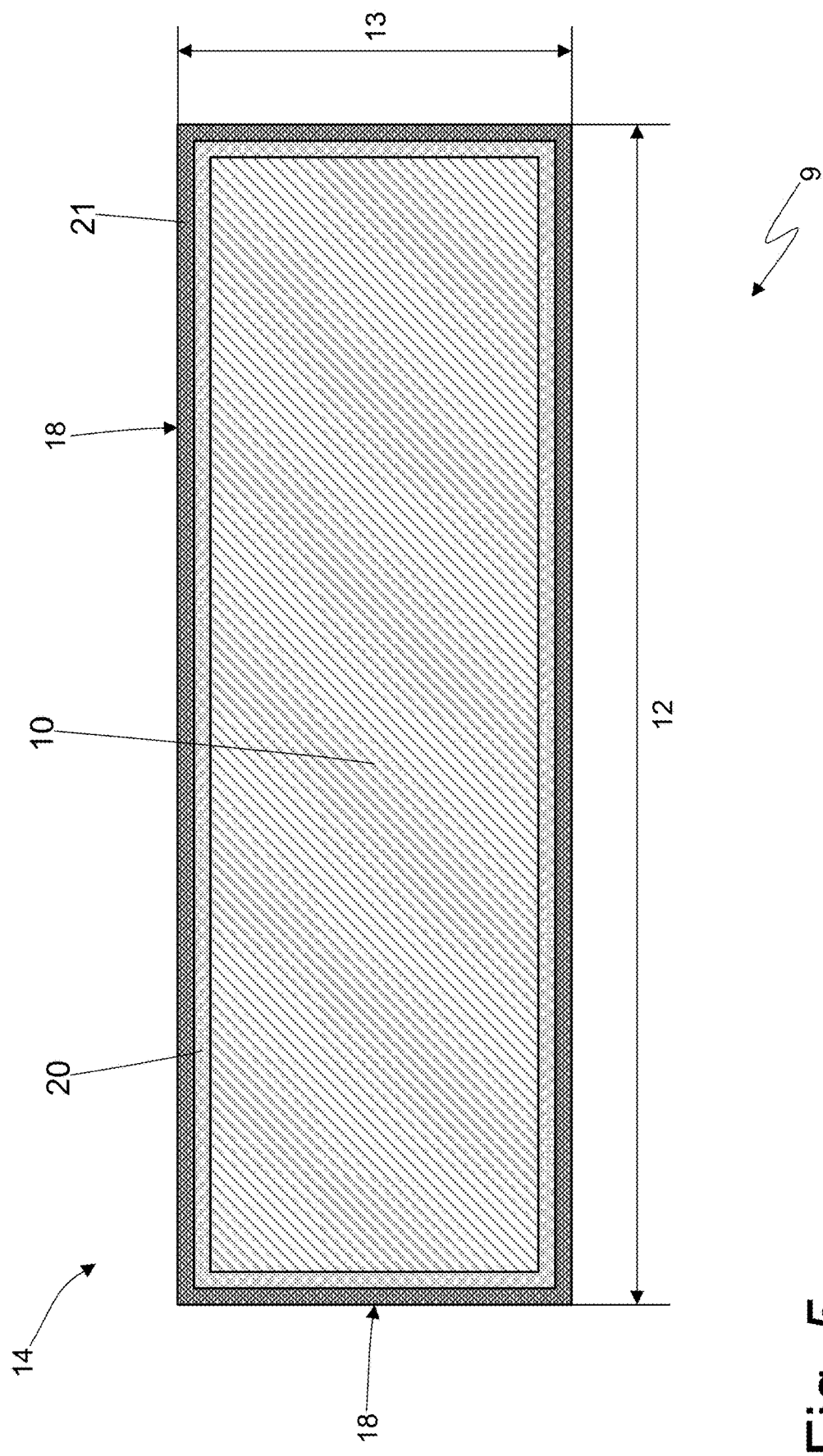
FIG. 5 is a transversal section view of a bar of a stator winding of the stator of FIG. 2.

According to what shown in FIG. 5, each bar 9 has a rectangular transversal section having a longer side 12 and a shorter side 13 and is covered on the outside with an insulating coating 14.

Figure 4:
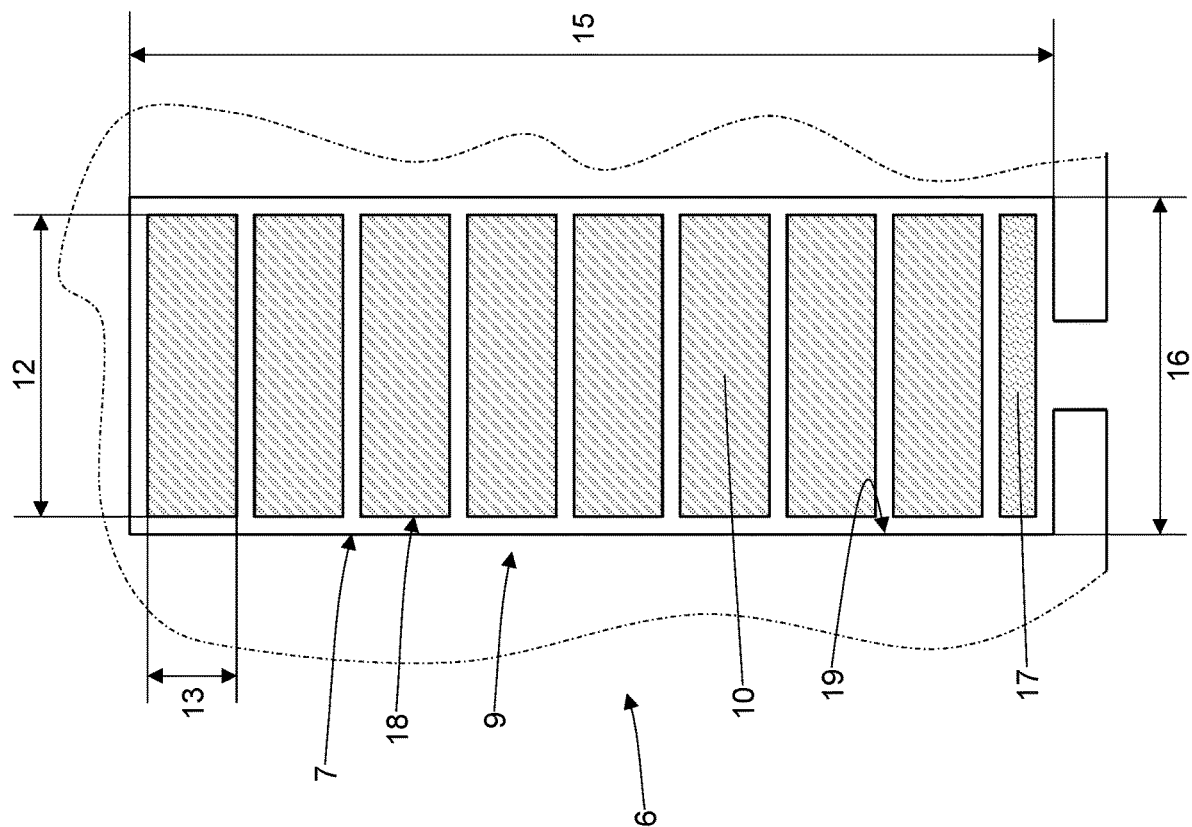
FIG. 4 is a transversal section view of a stator slot of the stator of FIG. 2.

According to what shown in FIG. 4, each stator slot 7 has a rectangular transversal section having a longer side 15 that is arranged radially and a shorter side 16 arranged circumferentially.

As previously said and as shown in FIG. 4, each stator slot 7 houses eight bars 9 arranged one after the other in a row; furthermore, each bar 9 has a rectangular transversal section having the longer side 12 parallel to the shorter side 16 of the corresponding stator slot 7 and the shorter side 13 parallel to the longer side 15 of the corresponding stator slot 7. Furthermore, and as better shown in FIG. 5, in each bar 9 the ratio between the longer side 12 and the shorter side 13 of the rectangular transversal section is higher than 2 and preferably higher than 3; in particular according to a preferred embodiment, in each bar 9 the ratio between the longer side 12 and the shorter side 13 of the rectangular transversal section is between 3 and 3.7. This arrangement and this conformation of the bars 9 combined between them allow to significantly reduce power losses due to skin effect inside the bars 9 increasing the power efficiency and also increasing the specific performance (power and/or torque).

According to one preferred embodiment shown in FIGS. 2 and 3, each bar 9 is bent around the shorter side 13 of the rectangular transversal section, i.e. each bar 9 is bent "along the side". In other words, each bar 9 is bent relative to the shorter side 13 (along the shorter side 13) of the rectangular transversal section.

According to the embodiment shown in FIG. 4, in each stator slot 7 the legs 10 of eight bars 9 are arranged in a row and a filling element 17 (optional) is arranged which has a given elastic deformability and has the function of filling the remaining space inside the stator slot 7 compacting the legs 10 of the eight bars 9.

According to what shown in FIG. 4, each stator slot 7 is completely free from an insulating element interposed between the ferromagnetic material making up the laminations of the magnetic core 6 and the corresponding bars 9, so that an outer surface 18 of the corresponding bars 9 is in direct contact with an inner surface 19 of the stator slot 7 made of ferromagnetic material of the stator slot 7. This solution forces to increase the thickness of the insulating coating 14 of each bar 9, however it allows to overall increase the filling coefficient of the stator slots 7 (i.e. the ratio between the area of the overall transversal section of the copper present in each stator slot 7 and the area of the transversal section of the stator slot 7) increasing the specific performance (power and/or torque).

According to what shown in FIG. 5, the insulating coating 14 which covers on the outside each bar 9 has a thickness higher than 0.30 (e.g. equal to 0.35-0.40 mm). Furthermore, according to one possible though non-limiting embodiment, the insulating coating 14 covering on the outside each bar 9 has an inner layer 20 which is in direct contact with the copper and has a thickness of about 0.20-0.25 mm and an outer layer 21 which is arranged above the inner layer 20, has a thickness of about 0.10-0.15 mm, and is in direct contact with the ferromagnetic material making up the laminations of the magnetic core 6. The inner layer 20 consists of a first material (an enamel or a resin) and the outer layer 21 consists of a second material (an enamel or a resin) which differs from the first material. In particular, the second material is mechanically stronger and electrically less insulating than the first material; i.e. the inner layer 20 essentially has the function of ensuring electric insulation while the outer layer 21 essentially has the function of mechanically protecting the inner layer 20 from rubbing against the inner surface 19 of the stator slot 7 when the leg 10 of the bar 9 is inserted in the stator slot 7.

Figure 7:
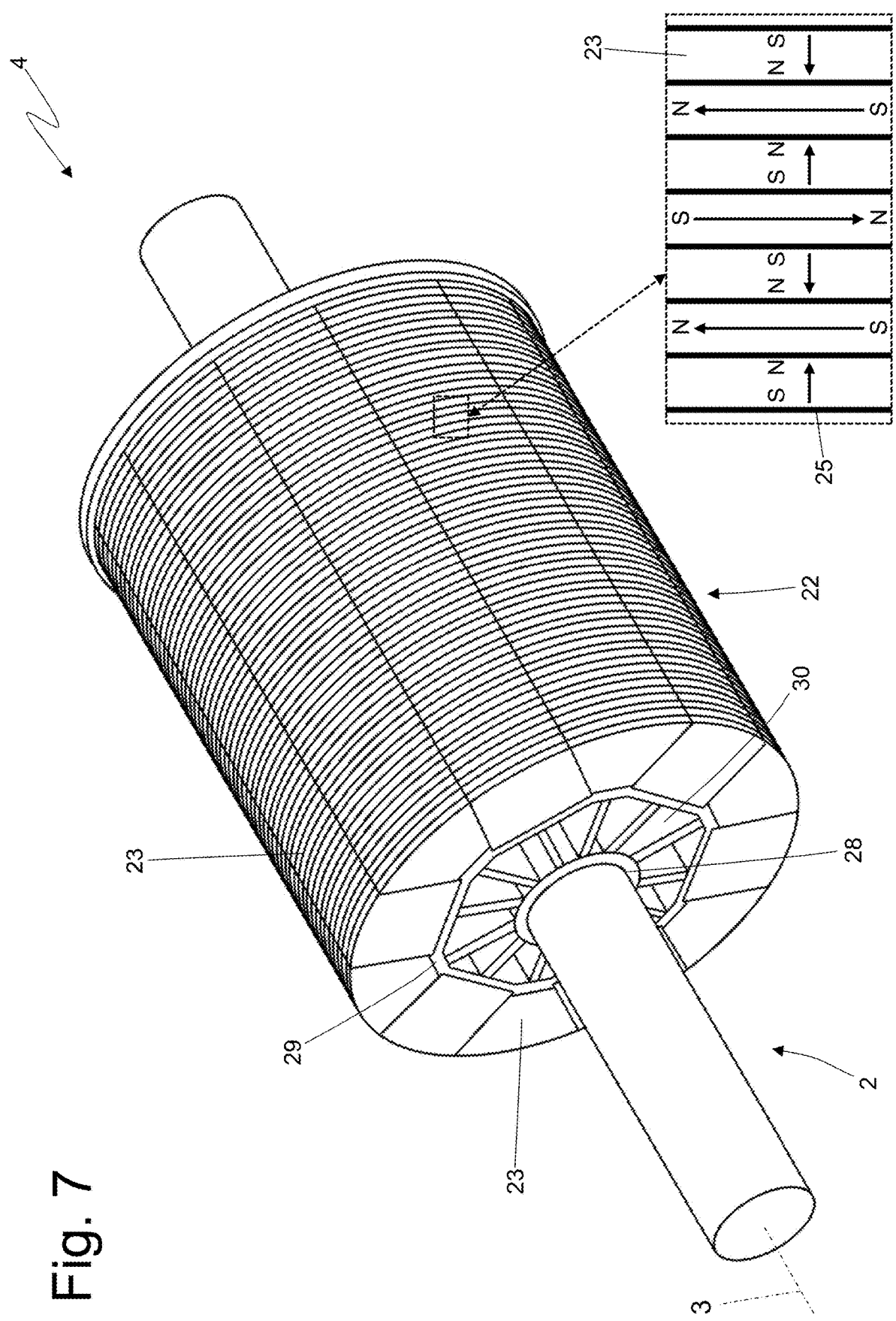
FIG. 7 is a perspective view of the rotor of FIG. 6 with some parts being removed for the sake of clarity.

According to what shown in FIG. 7, the rotor 4 comprises a plurality of magnetic elements 22, which are oriented axially and arranged beside one another around the rotation axis 3 to form a closed ring. In the embodiment shown in FIG. 7 they are provided twelve magnetic elements 22 arranged so as to form a closed ring, but according to other embodiments not shown the overall number of magnetic elements 22 may be different; for instance eight to twenty-four magnetic elements 22 may be provided.

The magnetic elements 22 may have a different transversal section, but they all have a same magnetic configuration; i.e. all the magnetic elements 22 (possibly) differ only in their transversal section but all have the same magnetic configuration.

Each magnetic element 22 consists of a sequence (column) of permanent magnets 23 arranged in a row one after the other, i.e. each magnetic element 22 is made up of a plurality of permanent magnets 23 which are arranged axially one after the other; in particular, in each magnetic element 22, twenty to sixty permanent magnets 23 arranged in a row beside one another are generally provided.

Each magnetic element 22 is made up of a plurality of permanent magnets 23 which are arranged axially one after the other according to a Halbach array to nullify the magnetic field radially inside the permanent magnets 23 and to maximize the magnetic field radially outside the permanent magnets 23. In other words, the permanent magnets 23 in each magnetic element 22 are arranged to nullify the magnetic field radially inside the permanent magnets 23 (towards the shaft 2) and to maximize the magnetic field radially outside the permanent magnets 23 (towards the magnetic core 6 of the stator 5).

A Halbach array is a particular union (arrangement) of the permanent magnets 23 arranged so as to strengthen the magnetic field along a face of the array (the radially most external face in the present embodiment) and in removing (nullify) at the same time by interference the magnetic field at the opposite face (the radially most internal face in the present embodiment). As shown in FIG. 7, the Halbach array provides that groups of four permanent magnets 23 are cyclically repeated: a permanent magnet 23 having a South-North orientation axially arranged rightward, a further permanent magnet 23 having a South-North orientation circumferentially arranged anticlockwise, a further permanent magnet 23 having a South-North orientation axially arranged leftward and a further permanent magnet 23 having a South-North orientation circumferentially arranged clockwise.

In other words, the rotor 4 comprises a plurality of magnetic elements 22, which are axially oriented, arranged beside one another around the rotation axis 3 so as to form a closed ring, and all have a same equal magnetic configuration; each magnetic element 22 is made up of a plurality of permanent magnets 23 which all have the same shape, axially arranged one after the other, and have polarities oriented in a different way according to a Halbach array. In each magnetic element 22 groups of four permanent magnets 23 (i.e. sets of four permanent magnets 23) are cyclically repeated, and in each group (set of four) of four permanent magnets 23, the four permanent magnets 23 respectively have: a polarity arranged axially with a first direction, a polarity arranged circumferentially with a second direction perpendicular to the first direction, a polarity arranged axially with a third direction opposite to the first direction, and a polarity arranged circumferentially with a fourth direction opposite to the second direction and perpendicular to the third (first) direction. As a result, each magnetic element 22 is made up of an integer of groups (sets of four) of four permanent magnets 23 and thus comprises a number of permanent magnets 23 that is an integer multiple of four.

In the embodiment shown in the enclosed figures, alternatively the magnetic elements 22 have a rectangular transversal section and an isosceles trapezoidal rectangular section; according to a different embodiment not shown, the magnetic elements 22 all have the same isosceles trapezoidal rectangular section.

Figure 8:
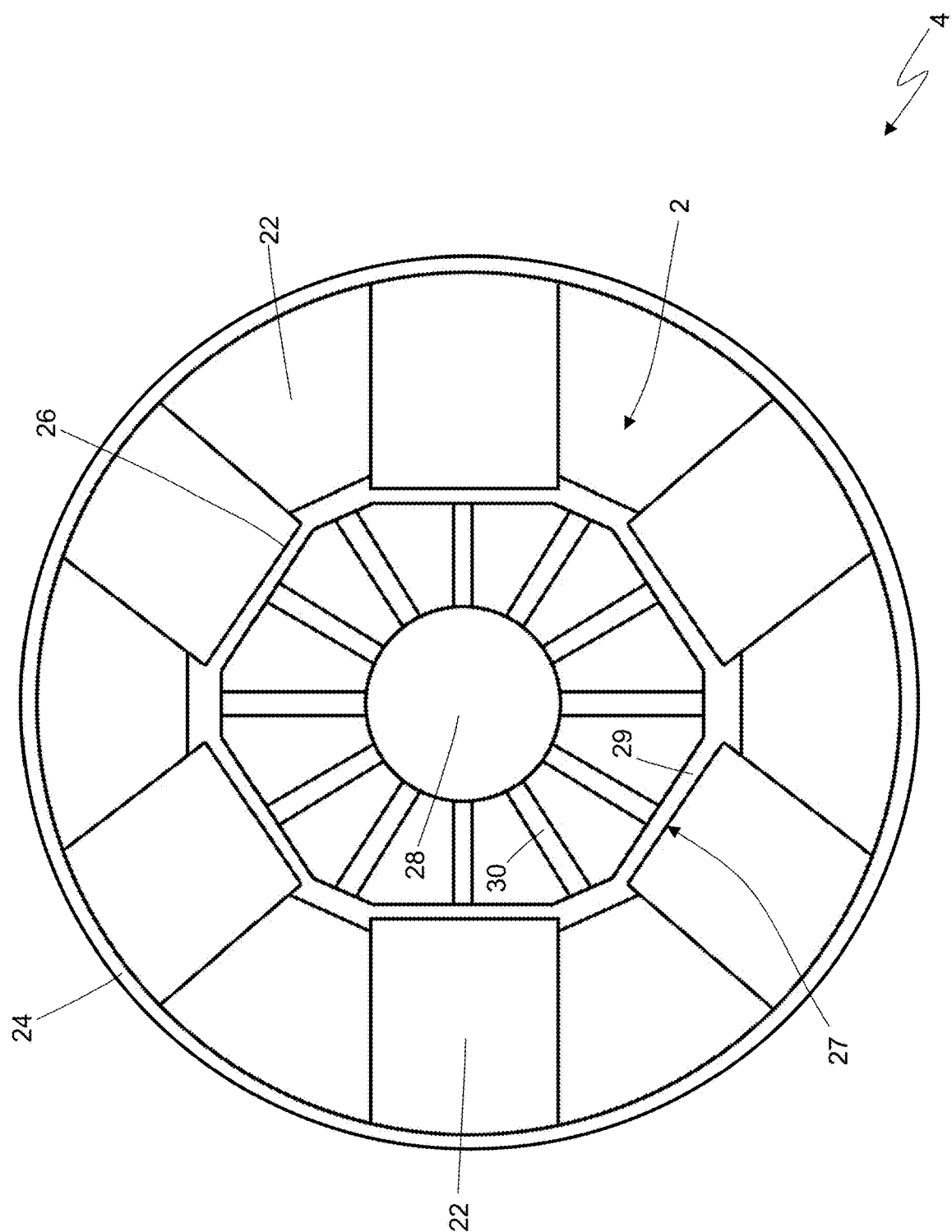
FIG. 8 is a transversal section view of the rotor of FIG. 6.

According to what better shown in FIG. 8, the rotor 4 is completely free from a ferromagnetic material arranged on the outside of the permanent magnets 23 (externally with respect to the permanent magnets 23), i.e. the rotor 4 is both free from a ferromagnetic material arranged radially on the outside of the permanent magnets 23 (i.e. between the permanent magnets 23 and the magnetic core 6 of the stator 5), and free from the ferromagnetic material arranged radially on the inside of the permanent magnets 23 (i.e. between the permanent magnets 23 and the shaft 2).

Figure 6:
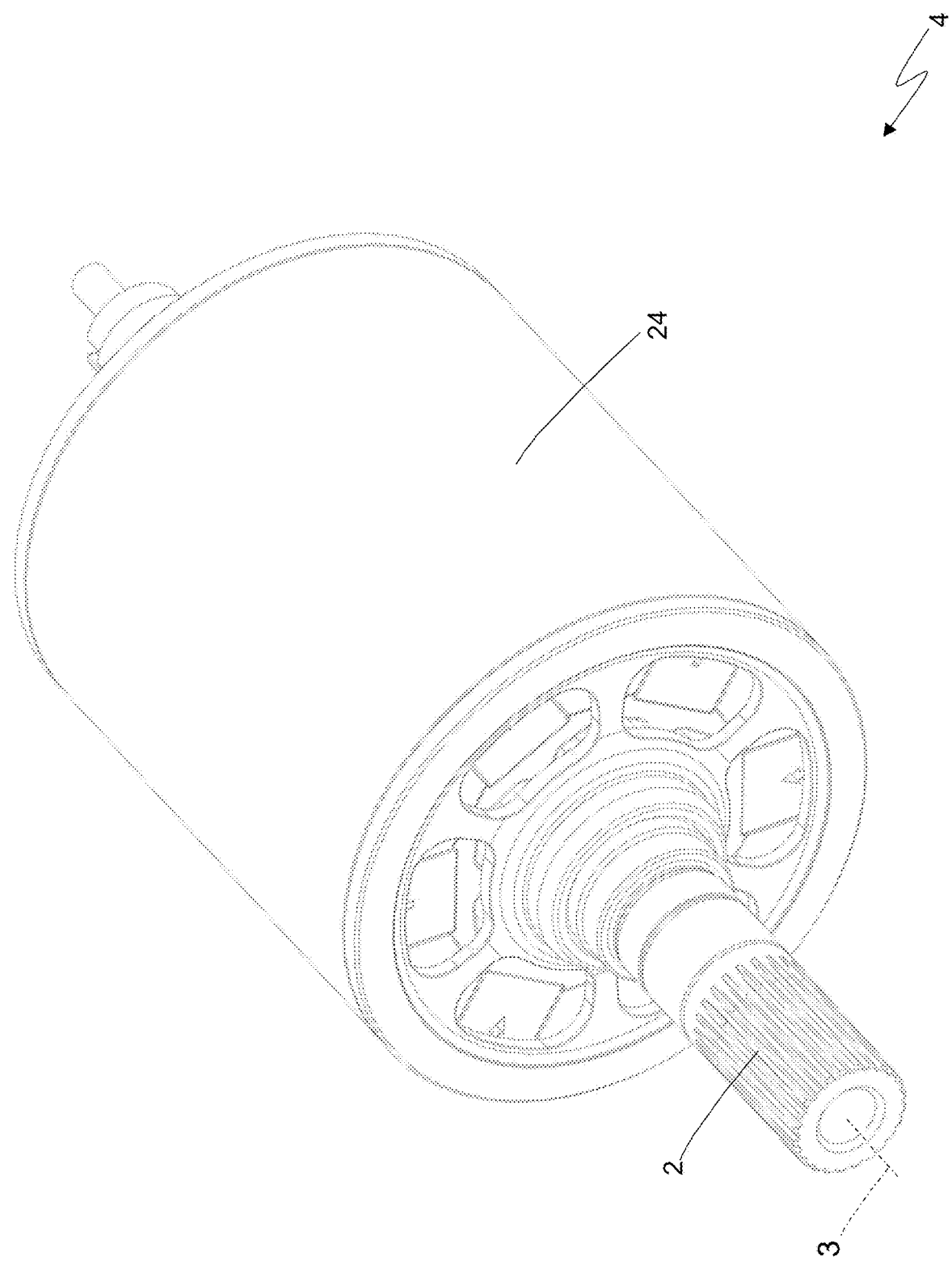
FIG. 6 is a perspective view of a rotor of the rotary electric machine of FIG. 1.

According to what shown in FIGS. 6 and 8, the rotor 4 comprises a containment element 24 (not shown in FIG. 7) which is arranged around the magnetic elements 22 to keep the magnetic elements 22 in contact with the shaft 2; i.e. the containment element 24 covers on the outside the magnetic elements 22 so as to make a radial containment of the magnetic elements 22 such to avoid the centrifugal force from pushing them against the magnetic core 6 of the stator 5. According to one possible embodiment, the containment element 24 consists of a resin-treated filament wound in a spiral around the magnetic elements 22 of permanent magnets; according to an alternative embodiment, the containment element 24 consists of a tubular element made of composite material, light non-ferromagnetic metal material (for instance aluminium), or of ferromagnetic metal material.

According to one preferred embodiment shown in FIG. 7, in each magnetic element 22 the single permanent magnets 23 are glued between each other by interposing a glue 25 which is preferably an electric insulation so as to reduce the power losses due to Eddy currents. In other words, each magnetic element 22 is made by gluing the single permanent magnets 23 between each other by the glue 25 which is preferably an electric insulation.

According to a preferred embodiment shown in FIGS. 7 and 8, the magnetic elements 22 are mounted directly on an outer wall of the shaft 2; in particular, each magnetic element 22 is glued to the outer wall of the shaft 2 by a glue 26 (shown in FIG. 8) which is preferably an electric insulation (to avoid "short-circuiting" the various permanent magnets 23 of a same magnetic element 22 between them by the outer wall of the shaft 2). In other words, between the outer wall of the shaft 2 and the magnetic elements 22 an electrically insulating layer consisting of glue 26 is interposed. According to a different embodiment, the glue 26 may also be an electric insulation; i.e. the glue 26 is not required to be an electric insulation.

The glue 26 has the function of electrically insulating the magnetic elements 22 from the underlying outer wall of the shaft 2 and has also the function of connecting the magnetic elements 22 to the outer wall of the shaft 2 while the rotor 4 is being constructed (the mechanical holding of the magnetic elements 22 of permanent magnets is carried out by the containment element 24 as the glue 26 is not able to bear the centrifugal force when the rotor 4 rotates at high speed).

According to a preferred embodiment shown in FIGS. 7 and 8, the outer wall of the shaft 2 has a plurality of seats 27, each of which is adapted to accommodate a corresponding magnetic element 22 of permanent magnets; i.e. each seat 27 is shaped such to reproduce in form of a recess the shape of the corresponding magnetic element 22 of permanent magnets so as to accommodate and house with a minimum clearance the magnetic element 22.

According to what shown in FIG. 8, the shaft 2 has a hub 28 supported by bearings (not shown), a rim 29 which is arranged around the hub 28 at a given distance from the hub 28 and supports the magnetic elements 22 (i.e. constitutes the outer wall of the shaft 2), and a plurality of spokes 30 which develop radially and connect the hub 28 to the rim 29 such that between the hub 28 and the rim 29 there is some empty space.

According to what illustrated in FIG. 1, the electric machine 1 comprises a casing 31 which houses the stator 5 therein and has a cylindrical central body 32 arranged around the magnetic core 6 of the stator 5 and two cup-shaped caps 33 (but they could also be flat) that close the central body 32 on the opposite sides. Between an outer surface of the magnetic core 6 of the stator 5 and an inner surface of the central body 32 of the casing 31 an annular hollow space 34 is obtained, which is adapted to allow an air flow to circulate. In the embodiment shown in FIG. 1, each cap 33 is coupled with a liquid—(i.e. inside which a cooling liquid circulates) or air-heat exchanger 35 (i.e. hit by a cool air flow); according to different embodiments, a single heat exchanger 35 is provided that is coupled with only a cap 33 (as shown in FIG. 10) or no heat exchanger 35 is provided (variant not shown).

Figure 9:
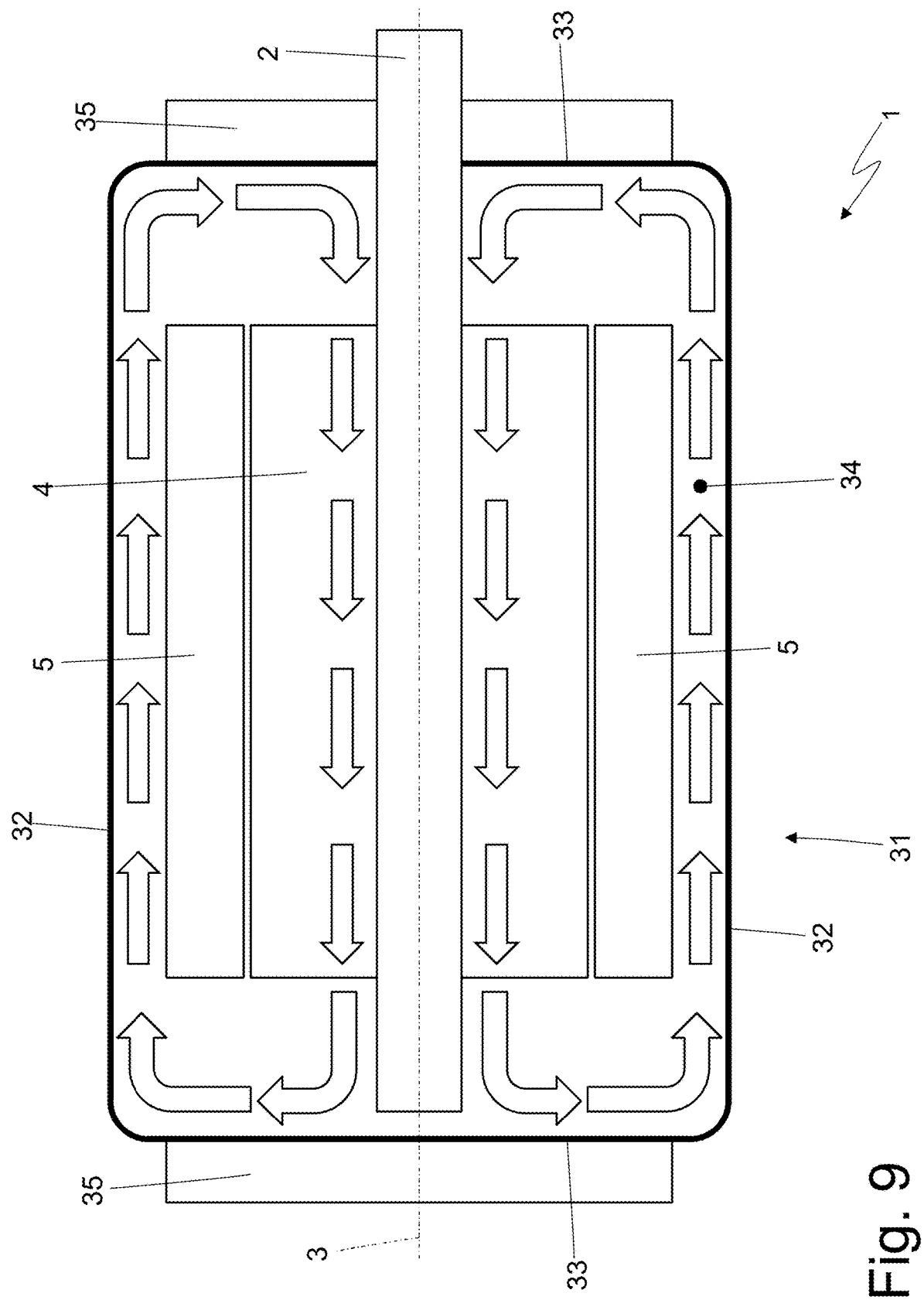
FIG. 9 is a schematic and longitudinal section view of the rotary electric machine of FIG. 1 with air flow paths during operation being highlighted.

According to what shown in FIG. 9, the spokes 30 of the shaft 2 are shaped (for instance as a helix) so as to cause the air present inside the shaft 2 to have an axially oriented component of motion; thereby, when the shaft 2 rotates the air inside the shaft 2 (i.e. in the empty gaps between the spokes 30) receives an axial thrust generating an air flow directed axially flowing through the shaft 2; the air flow which exits the shaft 2 hitting a cap 33 (arranged on the left in FIG. 9) is deviated outwardly up until it enters the annular hollow space 34 flowing through it along a direction opposite to the direction of motion provided by the spokes 30 of the shaft 2. Thereby, when the shaft 2 rotates, inside the casing 31 a continuous air flow is generated that circulates in a direction inside the shaft 2 and in an opposite direction outside the stator 5; this air flow takes heat away from inside the shaft 2 and brings it to the casing 31 (i.e. towards the outside), in other words both towards the caps 33 (which can be coupled to heat exchangers 35 more or less integrated with the caps 33), and towards the central body 32 (which can be also coupled to a heat exchanger more or less integrated with the central body 32).

Figure 10:
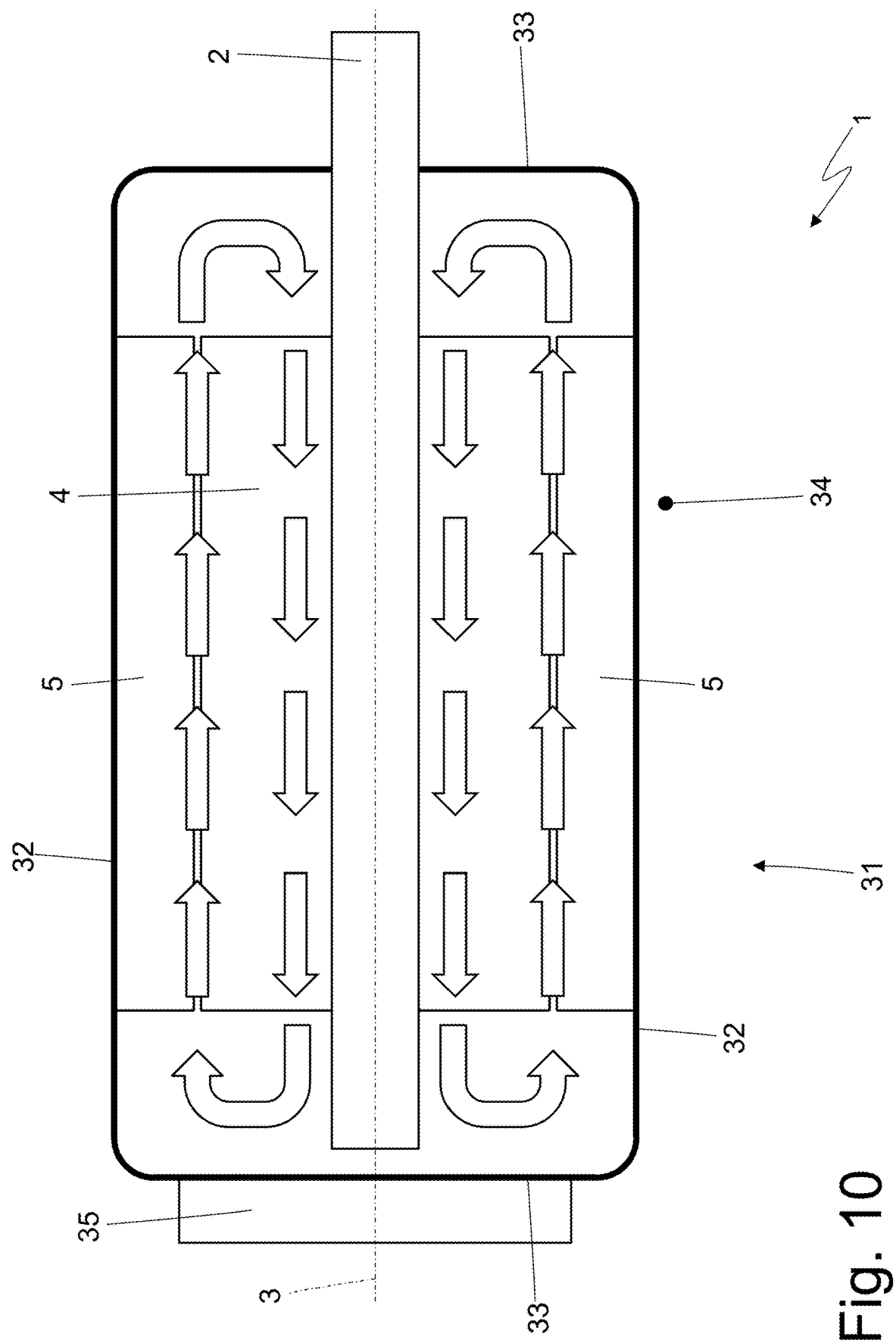
FIG. 10 is a schematic and longitudinal section view of a variant of the rotary electric machine of FIG. 1 with air flow paths during operation being highlighted.

In the variant shown in FIG. 10, the annular hollow space 34 is not provided and therefore the air flow exiting the shaft 2 hitting a cap 33 (arranged on the left in FIG. 10) is deviated towards the gap existing between the rotor 4 and the stator 5 up until it enters into the gap flowing through it along a direction opposite to the motion provided by the spokes 30 of the shaft 2.

Thereby, when the shaft 2 rotates, inside the casing 31 a continuous air flow is generated which circulates in a direction inside the shaft 2 and in an opposite direction inside the gap; this air flow takes heat away from inside the shaft 2 and from outside the rotor 4 and brings it towards the caps 33 of the casing 31 (i.e. outwardly). Obviously also in the embodiment shown in FIG. 9, a small part of the air flow flows through the gap instead of the hollow space 34; however, most of the air flow flows through the hollow space 34 which has a transversal section that is much larger than a transversal section of the gap.

Thanks to the continuous air flow being present inside the shaft 2 it is possible to effectively cool the shaft 2 and therefore the rotor 4 without having to cool the rotor 4 by means of a coolant which is particularly complicated (requiring to continuously make the coolant pass from a fixed part to a rotary part).

According to one possible embodiment, inside the two caps 33, a plurality of fins are arranged that are shaped so as to guide an air flow from the centre to the periphery and vice versa, i.e. on the one hand for guiding the air flow from the shaft 2 towards the annular hollow space 34 and on the other hand for guiding the air flow from the annular air flow 34 towards the shaft 2.

According to a preferred, though non-limiting, embodiment, the spokes 30 are shaped so as to generate, during the rotation of the shaft 2, a predetermined sound; i.e. the shape of the spokes 30 is designed to generate, during the rotation of the shaft 2 a desired sound.

The herein described embodiments may be combined between them without departing from the protection scope of the present invention.

The above described electric machine 1 has several advantages.

Firstly, the above described electric machine 1 has a high power efficiency (i.e. a high yield between the inlet mechanical or electric power and the outlet mechanical or electric power).

Furthermore, the above described electric machine 1 has a high specific performance (power and/or torque), i.e. a high performance (power and/or torque) by mass and/or volume unit.

Finally, the above described electric machine 1 is of easy and cheap construction, as it does not substantially involve production costs higher than a traditional electric machine with equal performances.

LIST OF REFERENCE NUMBERS OF THE FIGURES 1 electric machine
2 shaft
3 rotation axis
4 rotor
5 stator
6 magnetic core
7 stator slots
8 stator winding
9 bars
10 legs
11 cusp
12 longer side
13 shorter side
14 insulating coating
15 longer side
16 shorter side
17 filling element
18 outer surface
19 inner surface
20 inner layer
21 outer layer
22 magnetic element
23 permanent magnets
24 containing element
25 glue
26 glue
27 seats
28 hub
29 rim
30 spokes
31 casing
32 central body
33 caps
34 annular hollow space
35 heat exchanger

The invention claimed is:

1. An electric machine (1) comprising:
a shaft (2), which is mounted so as to rotate around a central rotation axis (3) along a circumferential rotational path defining a direction of motion;
a rotor (4) with permanent magnets which is fitted to the shaft (2) so as to rotate together with the shaft (2);
a stator (5) with a tubular, cylindrical shape, which is arranged around the rotor (4) so as to enclose, on the inside, the rotor (4) and has a magnetic core (6), which consists of a series of laminations made of a ferromagnetic material and is longitudinally crossed by a plurality of stator slots (7); and
a stator winding (8);
wherein the rotor (4) comprises a plurality of magnetic elements (22), which are axially oriented and thus perpendicular to the circumferential rotational path defining the direction of motion, arranged beside one another and in contact with each other around the rotation axis (3) so as to form a closed ring with no gaps between two adjacent magnetic elements (22), and all have a similar magnetic configuration; and
wherein each magnetic element (22) is formed by a column of permanent magnets (23) which all have a same shape, are axially arranged one after the other and have polarities oriented in a different way according to a Halbach array developing along an axial direction perpendicular to the circumferential rotational path defining the direction of motion.

2. The electric machine (1) according to claim 1, wherein:
in each magnetic element (22) groups of four permanent magnets (23) are repeated cyclically; and
in each group of four permanent magnets (23), the four permanent magnets (23) respectively have: a polarity axially arranged in a first direction, a polarity circumferentially arranged in a second direction that is perpendicular to the first direction, a polarity axially arranged in a third direction opposite to the first direction, and a polarity arranged circumferentially in a fourth direction opposite to the second direction.

3. The electric machine (1) according to claim 2, wherein each magnetic element (22) consists of an integer of groups of four permanent magnets (23) and thus comprises a number of permanent magnets (23) which is an integer multiple of four.

4. The electric machine (1) according to claim 1, wherein the permanent magnets (23) in each magnetic element (22) are arranged so as to nullify the magnetic field radially on the inside of the permanent magnets (23) and to maximize the magnetic field radially on the outside of the permanent magnets (23).

5. The electric machine (1) according to claim 1, wherein the rotor (4) is free from a ferromagnetic material arranged radially on the outside of the permanent magnets (23) and is free from a ferromagnetic material arranged radially on the inside of the permanent magnets (23).

6. The electric machine (1) according to claim 1, wherein the rotor (4) comprises a containment element (24), which is arranged around the magnetic elements (22).

7. The electric machine (1) according to claim 1, wherein, in each magnetic element (22) the single permanent magnets (23) are glued to one another through the interposition of a first glue (25), which preferably is an electric insulation.

8. The electric machine (1) according to claim 1, wherein the magnetic elements (22) are directly mounted on an outer wall of the shaft (2).

9. The electric machine (1) according to claim 8, wherein each magnetic element (22) is glued to the outer wall of the shaft (2) by means of a second glue (26), which preferably is an electric insulator.

10. The electric machine (1) according to claim 8, wherein the outer wall of the shaft (2) has a plurality of seats (27), each of which is adapted to accommodate a corresponding magnetic element (22).

11. The electric machine (1) according to claim 1, wherein the shaft (2) has a hub (28) supported by bearings, a rim (29), which is arranged around the hub (28) at a given distance from the hub (28) and supports the magnetic elements (22), and a plurality of spokes (30), which develop radially and connect the hub (28) to the rim (29) so that between the hub (28) and the rim (29) there is some empty space.

12. The electric machine (1) according to claim 11, wherein between the rim (29) and the magnetic elements (22) an electrically insulating layer is interposed.

13. The electric machine (1) according to claim 11, wherein the spokes (30) are shaped so as to cause the air present inside the shaft (2) to have an axially oriented component of motion.

14. The electric machine (1) according to claim 13, wherein:
- a casing (31) is provided, which houses, on the inside, the stator (5) and has a cylindrical central body (32), which is arranged around the magnetic core (6) of the stator (5), and two caps (33), which close the central body (32) on the opposite sides thereof; and
- between an outer surface (18) of the magnetic core (6) of the stator (5) and an inner surface (19) of the central body (32) of the casing (31) an annular hollow space (34) is obtained, which is designed to allow an air flow to circulate.

15. The electric machine (1) according to claim 13, wherein an air flow generated by the rotation of the spokes (30) closes by exclusively flowing through an air gap existing between the rotor (4) and the stator (5) in an opposite direction.

16. The electric machine (1) according to claim 13, wherein a casing (31) is provided, which houses, on the inside, the stator (5) and has a cylindrical central body (32), which is arranged around the magnetic core (6) of the stator (5) and two caps (33) which close the central body (32) on the opposite sides thereof.

17. The electric machine (1) according to claim 11, wherein the spokes (30) are shaped so as to generate, during the rotation of the shaft (2), a predetermined sound.

18. The electric machine (1) according to claim 1, wherein:
- a casing (31) is provided, which houses, on the inside, the stator (5) and has a cylindrical central body (32), which is arranged around the magnetic core (6) of the stator (5) and two caps (33) which close the central body (32) on the opposite sides thereof; and
- a heat exchanger (35) is coupled to at least one cap (33).

19. The electric machine (1) according to claim 1, wherein the stator winding (8) comprising a plurality of copper rigid bars (9), which are inserted in corresponding stator slots (7) and are covered, on the outside, with an insulating coating (14).

* * * * *